G. D. PARKER.
COMBINED ELEVATING AND DUMPING APPARATUS.
APPLICATION FILED JAN. 6, 1911.
1,045,072.
Patented Nov. 19, 1912.
2 SHEETS—SHEET 2.
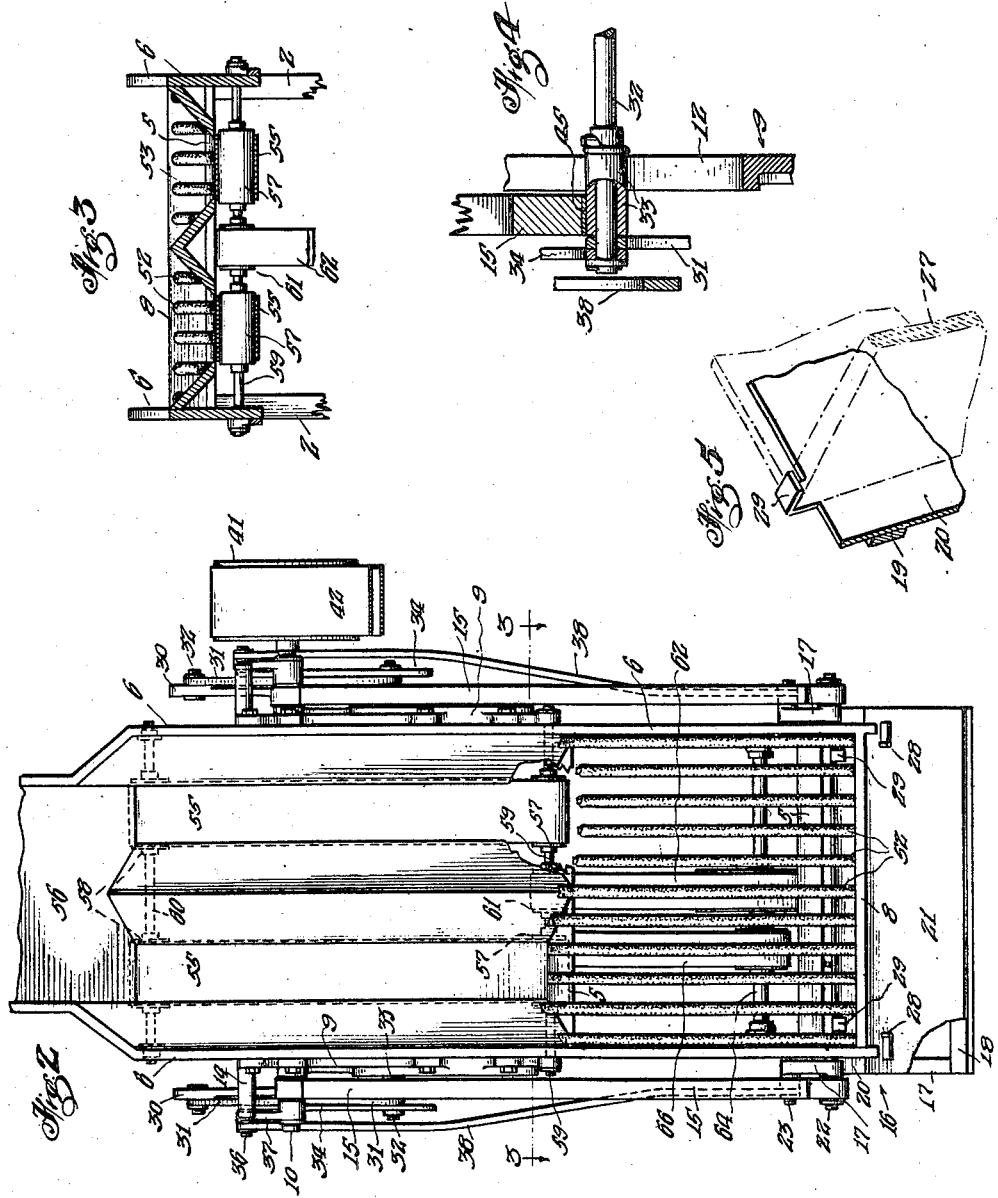

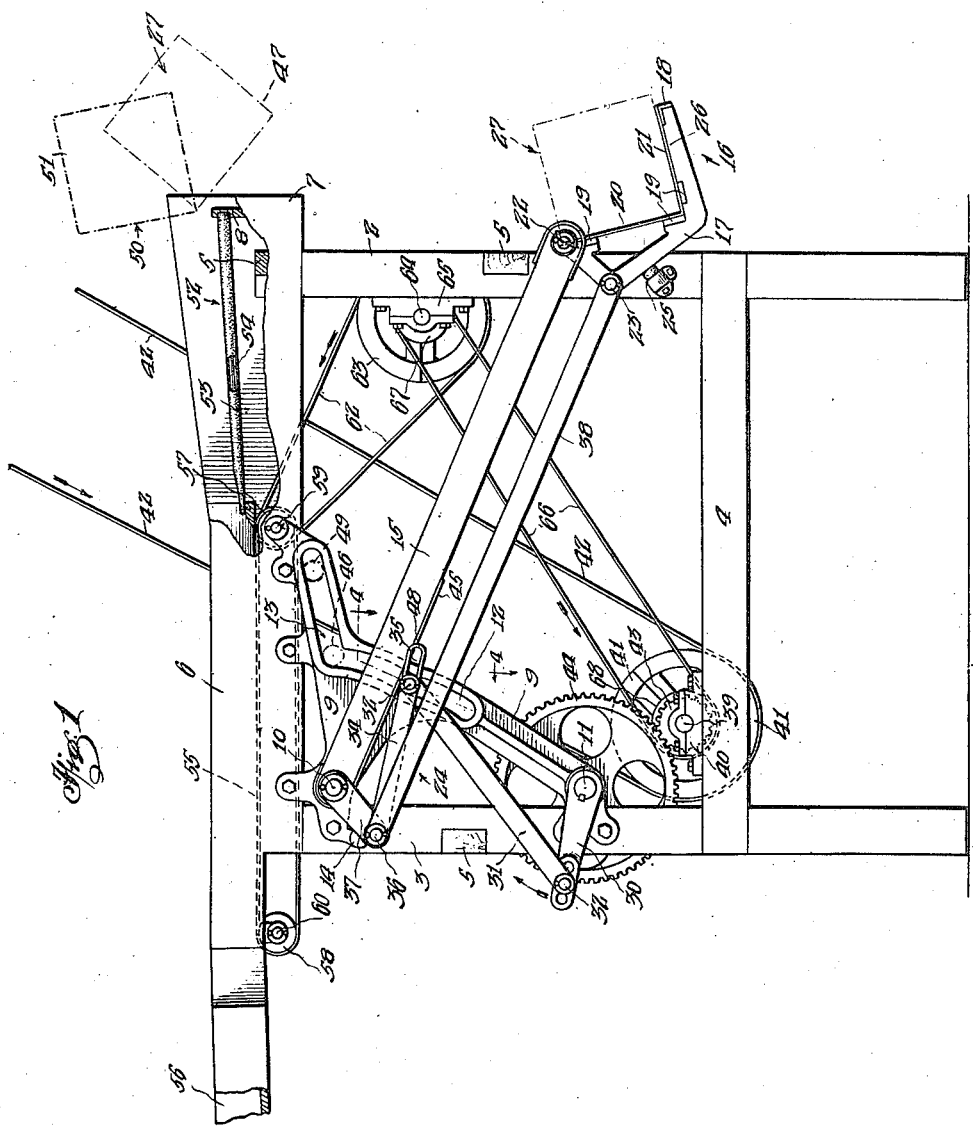

UNITED STATES PATENT OFFICE.

GEORGE D. PARKER, OF RIVERSIDE, CALIFORNIA.

COMBINED ELEVATING AND DUMPING APPARATUS.

1,045,072.  Specification of Letters Patent.  Patented Nov. 19, 1912.

Application filed January 6, 1911. Serial No. 601,171.

*To all whom it may concern:*

Be it known that I, GEORGE D. PARKER, a citizen of the United States of America, residing at Riverside, in the county of Riverside, State of California, have invented a certain new and useful Combined Elevating and Dumping Apparatus; and I do hereby declare the following to be a full, clear, and exact description of the invention, such as will enable others skilled in the art to which it appertains to make and use the same.

This invention relates to combined elevating and dumping apparatus; and it may be said to consist of the novel and improved construction, arrangement and combination of parts therein as will appear from the description and claims hereinafter.

The invention has for its main objects to provide a new and useful apparatus of the character mentioned which shall be of simple and compact construction, adapted to be continuously driven, cheap to maintain and operate, and which shall act effectively and in an advantageous manner to elevate and dump articles contained in open receptacles; it being more especially designed for use in elevating and dumping oranges or lemons contained in boxes open at the top.

Other objects and the advantages of the invention will be apparent to those skilled in the art from the following description of one form of construction for apparatus embodying the invention when taken in connection with the accompanying drawings, in which—

Figure 1 is a side elevation of apparatus in which the invention is embodied, Fig. 2 is a plan view of the apparatus shown in Fig. 1, Fig. 3 is a section taken on the line 3—3 of Fig. 2, looking in the direction of the arrows, Fig. 4 is a sectional view taken on the line 4—4 of Fig. 1, Fig. 5 is a fragment of the back of the carrier showing one of the lips thereon.

The preferably rectangular framework of the apparatus, one side only of which is shown in Fig. 1, may comprise standards 2 at each side of the fore part of the apparatus, together with suitable longitudinal crosspieces 4 and transverse crosspieces 5 connected to the standards 2 and 3. On the top end portions of standards 2 and 3 at each side of the apparatus may be arranged side boards 6 which may have their outer sides flush with the outer sides of the standards and may have the ends 7 thereof extending forwardly of the standards 2 and connected by the crosspiece 8. On each side of the framework may be arranged a part 9, substantially as shown in Fig. 1, which part may be formed to permit of its being suitably secured to the sideboard 6 and to the standard 3 to act as a brace, and to provide bearings for the shafts 10 and 11, respectively near the upper and the lower ends of the part, and also to provide the upwardly and forwardly inclined guideway 12, having, as shown, a somewhat sharp bend 13 in the upper portion thereof whereby this portion has but a small angle of inclination with the horizontal. Formed integral with or secured to each of the parts 9 is a stop 14. On the ends of the shaft 10 are loosely mounted the rear ends of the arms 15 which have pivotally mounted between their forward ends the carrier 16. The carrier 16 may be formed of the brackets 17 joined at their front ends by an angle iron and at other suitable points by the strips 19 to which may be secured the plate 20 and the plate 21 substantially at right angles to the plate 20. The brackets 17 may each be provided with a stud 22 whereby they are pivotally connected with the arms 15 and they may each have a pivot stud 23 whereby tilting mechanism 24 may be connected with the carrier 16. As seen in Fig. 1, where the carrier 16 is shown at rest with the brackets 17 bearing against resilient buffers 25 on the standards 2, the pivot studs 23 are preferably located at an elbow in the rear portions of the brackets 17 and the portion 26 of the brackets 17 may be upwardly inclined forwardly in order that the carrier may be slightly tilted rearwardly so that a box 27, indicated by dotted lines, may be more easily placed in position on the carrier. Abutments 28, between which the box 27 may fit, may be provided on the plate 21, and the plate 20 may be provided with lips 29 which are adapted to project over the top edge of the rear side of the box 27 to retain the box on the carrier when it is tilted rearwardly to dump its contents.

The mechanism for raising the arms 15 may comprise crank arms 30 keyed on the ends of shaft 11 and having pivotally connected therewith the links 31 by means of pins 32 passing through one of a series of openings in the end of the crank arms; the links 31 being also pivotally connected at the ends of a shaft 32 on which are also loosely mounted the rollers 33 which have a portion thereof extending into the guideway 12 and a portion thereof extending beneath the arms 15 and adapted when in engagement with the arms to bear against metallic lining strips 45 on the arms. As seen more clearly in Figs. 1 and 4, the tilting mechanism 24 may comprise the link 34 having one end portion thereof provided with a slot 35 through which shaft 32 passes and having the other end thereof pivotally mounted on the stud 36 carried by the link 37 which is pivotally mounted on the shaft 10, and a link 38 pivotally connected with the stud 36 and also with the stud 23 on the carrier 16. As shown, the preferable arrangement of the studs is such the distance between the axes of the studs 36 and 23 is substantially equal to the distance between the axes of the shaft 10, and the stud 36 is substantially equal to that between the axes of the studs 22 and 23, whereby the link 38 is constrained to move parallel to the arm 15 to permit of a compact arrangement of the parts and simplicity of operation. It will be understood that tilting mechanism similar to that just described may be provided on each side of the apparatus so as to be connected with each end of the carrier 16, if desired.

The driving mechanism may comprise a shaft 39 mounted in bearings 40 on the longitudinal crosspieces 4 and having keyed thereon a pulley 41, driven by belt 42, and also having keyed thereon a spur pinion 43 which meshes with a spur wheel 44 keyed to shaft 11.

In the operation of the apparatus already described, assuming that the parts are in the position as shown in Fig. 1, and that the box 27 contains oranges or lemons, it will be apparent that rotation of the spur wheel 44 in the direction indicated by the arrow will cause shaft 11 to rotate the crank arms and consequently the links 31 will be raised causing the shaft 32 and rollers 33 to move upwardly in the guideways 12 thereby raising the arms 15 to elevate the carrier 16. When the rollers reach the position indicated by 46 in Fig. 1, the box 27 on the carrier 16 will be in the position indicated by 47, and the shaft 32 will then have arrived at the outer end 48 of the slot 35, so that in its movement in the upper portion of the guideway it will gradually draw the link 34 forwardly to actuate the tilting mechanism whereby the carrier 16 is gradually tilted rearwardly during this movement, and when the rollers 33 and shaft 32 reach the position indicated at 49, the box, the top thereof being indicated at 50, will be in the position indicated at 51 so that the oranges or lemons in the box are dumped therefrom onto the resilient bed 52. In the return or downward movement of the rollers 33 and shaft 32 in the guideway, it will be apparent that the tilting mechanism is quiescent during the interval of time that it takes for the shaft 32 to be moved from the outer end 48 of the slot to the other end of the slot, so that complete emptying from the box of the oranges or lemons may be effected; and after the shaft 32, being moved downwardly by the link 31, has arrived at the other end of the slot, it will gradually push the link 34 rearwardly to actuate the tilting mechanism to gradually tilt the carrier 16 forwardly. When the shaft 32 and rollers 33 have been moved by the link 31 downwardly in the guideway to the position shown in Fig. 1, the link 37 will bear against the stop 14 and the carrier 16 will rest on the resilient buffers 25. The arms 15 will remain in the position shown in Fig. 1 during the interval of time that it takes for the link 31 to move the shaft 32 and rollers 33 to the end of their downward movement in the guideway and then upwardly to the position shown, and, the tilting mechanism meantime remaining quiescent because of the shaft 32 being moved to and fro in the slot 35 of the link 34, ample time is afforded for replacing the empty box on the carrier by one filled with oranges or lemons. As shown, the sideboards 6 may be of increased height at their forward end portions to prevent overflow of the oranges or lemons when they are being dumped on the resilient bed 52. The bed 52 may consist of a series of elastic tubes 53 having therein flat metallic strips 54 and secured at one end thereof to the crosspiece 8 and extending to and associated with a pair of belt conveyers 55 arranged to the rear of the apparatus. The oranges or lemons when dumped on the resilient bed 52 will gravitate to the belt conveyers 55 and may be conveyed by the latter to the chute 56 and thence to a conveyer or to apparatus to be washed, scrubbed, graded, or otherwise treated, as will be understood. The belt of each of the conveyers 55 may pass around pulleys 57 and 58 respectively on shafts 59 and 60 which may be suitably mounted on the sideboards 6, and a pulley 61 on the shaft 59 may be driven by belt 62 from pulley 63 on shaft 64 in bearings 65 mounted on the standards 2, the shaft 64 being driven by belt 66 passing over pulley 67 on the shaft 64 and over pulley 68 on the shaft 39.

While one form of construction for apparatus embodying the invention has been illustrated and described, there are many changes and modifications thereof that will readily occur to those skilled in the art and the right is reserved to all such changes and modifications as do not depart from the spirit and scope of the invention.

I claim:

1. In apparatus of the class specified, the combination of a shaft, arms pivotally mounted on said shaft, a carrier pivotally mounted on said arms, automatic means for raising said arms, and tilting mechanism connected to the carrier, said tilting mechanism operatively connected with the raising means for said arms.

2. In apparatus of the class specified, the combination of a shaft, arms pivotally mounted on said shaft, a carrier pivotally mounted on said arms, automatic continuously operated means for raising and lowering said arms, and tilting mechanism connected to the carrier, said tilting mechanism operatively connected with the raising means for said arms.

3. In apparatus of the class specified, the combination of a shaft, arms pivotally mounted on said shaft, a carrier pivotally mounted on said arms, means providing guideways, rollers arranged in said guideways, means for moving said rollers in engagement with said arms, and tilting mechanism connected to the carrier, said tilting mechanism operatively connected with the last means.

4. In apparatus of the class specified, the combination of a shaft, arms pivotally mounted on said shaft, a carrier pivotally mounted on said arms, means providing guideways, rollers arranged in said guideways, continuously operated means for moving said rollers to raise and lower said arms and the carrier, and tilting mechanism connected to the carrier, said tilting mechanism operatively connected with the last means.

5. In apparatus of the class specified, the combination of a shaft, arms pivotally mounted on said shaft, a carrier pivotally mounted on said arms, means for raising said arms, and tilting mechanism connected to the carrier, said tilting mechanism operatively connected with the raising means for said arms, and adapted to be quiescent for a predetermined interval of time to permit of complete emptying of the contents of a receptacle that may be placed on the carrier.

6. In apparatus of the class specified, the combination of a shaft, arms pivotally mounted on said shaft, a carrier pivotally mounted on said arms, means providing guideways, rollers arranged in said guideways, continuously operated means for moving said rollers to raise and lower said arms and the carrier, and tilting mechanism connected to the carrier, said tilting mechanism operatively connected with the last means, and adapted to be quiescent for predetermined intervals of time while the carrier is in raised or in lowered position, for the purposes set forth.

7. In apparatus of the class specified, the combination of a shaft, arms pivotally mounted on said shaft, a carrier pivotally mounted on said arms; means providing upwardly and forwardly inclined guideways having a bend in the upper portions thereof whereby said upper portions have a small angle of inclination with the horizontal, rollers arranged in said guideways, means for moving said rollers to raise and lower the arms and carrier, and tilting mechanism connected with the carrier, said tilting mechanism including a slotted link operatively connected with the last means.

8. In apparatus of the class specified, the combination of a frame, a shaft, arms pivotally mounted on said shaft, a carrier pivotally mounted on said arms, means providing upwardly and forwardly inclined guideways having a bend in the upper portions thereof whereby said upper portions have a small angle of inclination with the horizontal, a shaft having rollers thereon arranged in said guideways, means for moving the last shaft to have the rollers engage the arms to raise and lower the arms and carrier, and tilting mechanism connected to the carrier, said tilting mechanism including a link having one thereof slotted and passed over the second shaft.

9. In apparatus of the class specified, the combination of a frame, a shaft, arms pivotally mounted on said shaft, a carrier pivotally mounted on said arms, means providing upwardly and forwardly inclined guideways having a bend in the upper portions thereof whereby said upper portions have a small angle of inclination with the horizontal, a shaft having rollers thereon arranged in said guideways, means for moving the last shaft to have the rollers engage the arms to raise and lower the arms and carrier, tilting mechanism connected to the carrier, said tilting mechanism including a link having one end portion thereof slotted and passed over the said shaft, resilient buffers on the frame for the carrier to contact with in lowered position, and a stop for the purpose set forth.

10. In apparatus of the class specified, the combination of a frame, a shaft, arms pivotally mounted on said shaft, a carrier pivotally mounted on said arms, means providing upwardly and forwardly inclined guideways having a bend in the upper portions thereof whereby said upper portions have a small angle of inclination with the horizontal, a shaft having rollers thereon arranged in said guideways, means for moving the last shaft to have the rollers engage the arms to raise and lower the arms and carrier, tilting mechanism comprising a link pivotally mounted on the first shaft and provided with a stud, a link having one end portion thereof provided with a slot through which the last shaft passes and having the other end thereof pivotally mounted on said stud, and a link pivotally connected with said stud and also pivotally connected with said carrier.

11. In apparatus of the class specified, the combination of a frame, a shaft, arms pivotally mounted on said shaft, a carrier pivotally mounted on said arms, means providing upwardly and forwardly inclined guideways having a bend in the upper portions thereof whereby said upper portions have a small angle of inclination with the horizontal, a shaft having rollers thereon arranged in said guideways, means for moving the last shaft to have the rollers engage the arms to raise and lower the arms and carrier, and tilting mechanism including a link pivotally connected with the carrier and a link having one end thereof pivotally connected with the first link and having its other end provided with a slot through which the second shaft passes, the first link constrained to move in parallel with said arms.

12. In apparatus of the class specified, the combination of a frame, a shaft, arms pivotally mounted on said shaft, a carrier pivotally mounted on said arms, means providing upwardly and forwardly inclined guideways having a bend in the upper portions thereof whereby said upper portions have a small angle of inclination with the horizontal, a shaft having rollers thereon arranged in said guideways, means for moving the last shaft to have the rollers engage the arms to raise and lower the arms and carrier, said carrier including side brackets, each having a rear portion thereof formed with an elbow and a portion upwardly inclined forwardly and a plate secured to said portions, a stud on the rear portion of one of said brackets, resilient buffers on said frame against which said brackets are adapted to bear, and tilting mechanism including a link pivotally connected with said stud, a link having one end thereof pivotally connected with the first link and having its other end provided with a slot through which the second shaft passes, and a stop for the purpose set forth.

In testimony whereof, I have signed my name to this specification in the presence of two subscribing witnesses at Riverside, county of Riverside, State of California, this 16th day of December A. D. 1910.

GEORGE D. PARKER.

Witnesses:
   CHAS. E. JOHNSON,
   L. B. SCRANTON.